United States Patent [19]

Johnson

[11] 4,445,779
[45] May 1, 1984

[54] DITHER SYSTEM FOR A SPRING MASS SYSTEM

[75] Inventor: Allan P. Johnson, Minneapolis, Minn.

[73] Assignee: Honeywell Inc., Minneapolis, Minn.

[21] Appl. No.: 280,954

[22] Filed: Jul. 6, 1981

[51] Int. Cl.³ .................... G01C 19/64; G05B 13/02
[52] U.S. Cl. ................................. 356/350; 318/631
[58] Field of Search ................ 356/350; 331/116 M; 372/94; 318/631, 118

[56] References Cited

U.S. PATENT DOCUMENTS

| | | | |
|---|---|---|---|
| 3,373,650 | 3/1968 | Killpatrich | 356/350 |
| 4,132,482 | 1/1979 | Friedland | |
| 4,243,324 | 1/1981 | Friedland | |

*Primary Examiner*—Vincent P. McGraw
*Attorney, Agent, or Firm*—Robert A. Pajak

[57] ABSTRACT

A dither motor system is described for a ring laser angular rate sensor which forms part of a spring-mass system. The dither motor system of the present invention provides selected control of the peak clockwise and/or peak counterclockwise dither angle of rotation of a spring-mass system.

27 Claims, 7 Drawing Figures

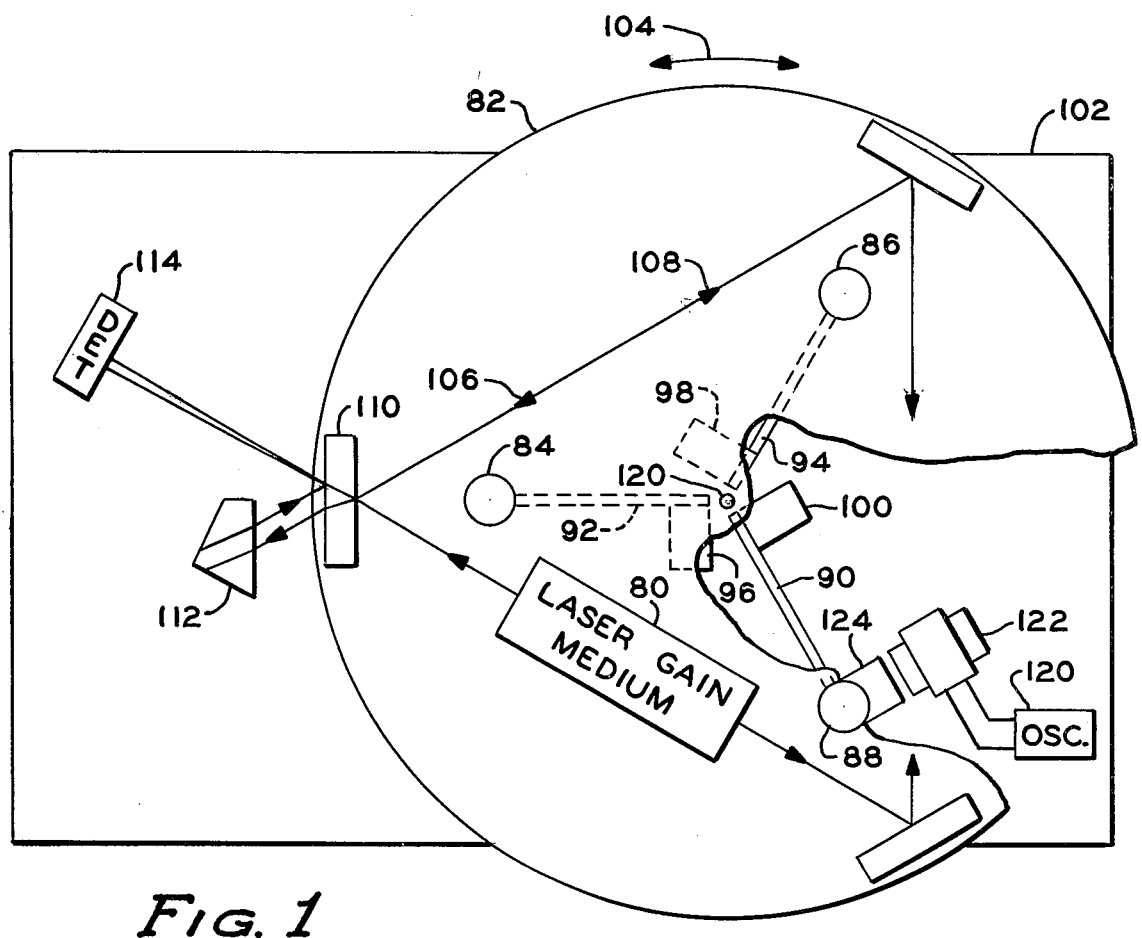
Fig. 1
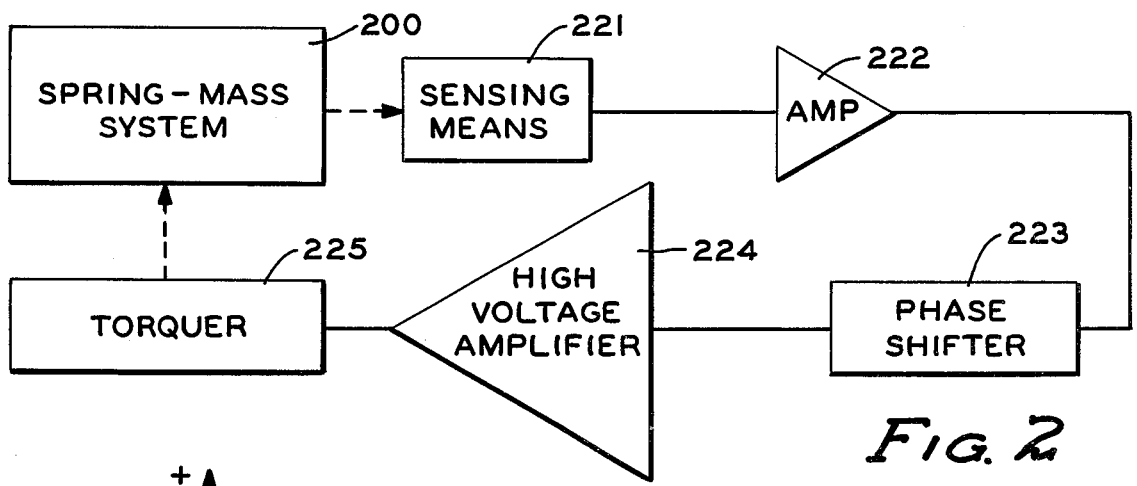
Fig. 2
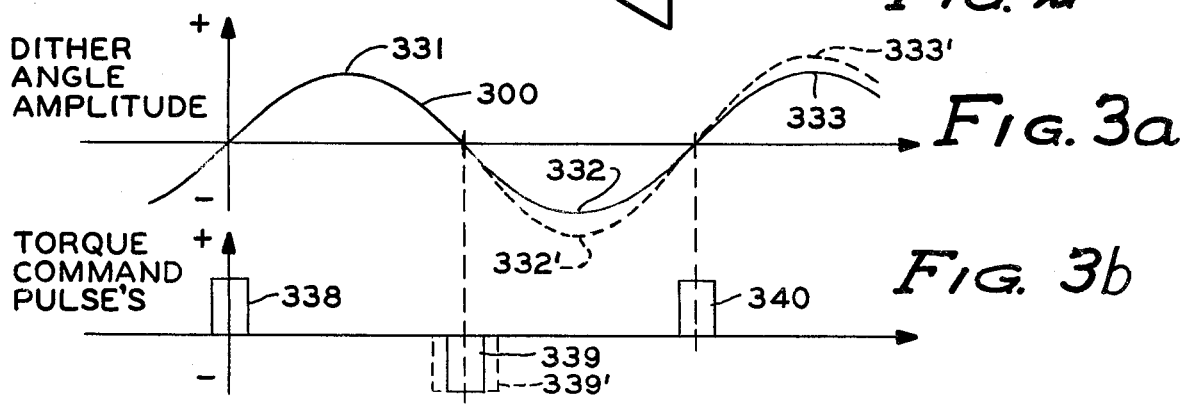
Fig. 3a
Fig. 3b

DITHER SYSTEM FOR A SPRING MASS SYSTEM

BACKGROUND OF THE INVENTION

The present invention relates to ring laser angular rate sensors in general and, more particularly, to a dithering system for such devices. Further, the present invention also relates to any spring mass system where controlled back and forth rotation is of importance.

A bothersome characteristic of the ring laser angular rate sensor is the phenomenon known as "lock-in". At sensor rotation rates below a critical value called the lock-in threshold or lock-in rate the frequency difference between the oppositely traveling laser beams tend to synchronize to a common value resulting in the frequency difference going to zero indicating no rotation at all. The lock-in characteristic arises due to mutual coupling between oppositely traveling beams in the sensor. The dominant source of the coupling is mutual scattering of energy from each of the beams into the direction of the other. The effect is similar to lock-in coupling effects which have been long understood in conventional electronic oscillators.

One technique for attempting to reduce or eliminate the effects of lock-in is to mechanically dither or oscillate the laser angular rate sensor, back and forth, so that the laser angular rate sensor is operating above the lock-in threshold for a majority of the time. The system using this principle is disclosed in U.S. Pat. No. 3,373,650, by Joseph E. Killpatrick, entitled "Laser Angular Rate Sensor", and assigned to the same assignee as the present application. Disclosed in U.S. Pat. No. 3,373,650 is a dither system for oscillating a spring mass system including the laser angular rate sensor. The dither system described therein will oscillate the laser angular rate sensor at the natural resonant frequency of the spring mass system and will oscillate, back and forth, at substantially a constant peak-to-peak dither angle amplitude.

Recent developments in ring laser angular rate sensor technology have found it desirable to control the dithering motion of the laser angular rate sensor in a more controlled manner. It is the object of the invention to provide a dither system for oscillating the laser angular rate sensor having controlled clockwise and controlled counterclockwise dither angle amplitudes in response to a dither angle amplitude control signal.

SUMMARY OF THE INVENTION

The present invention provides a dither system for oscillating the spring-mass system of the laser angular rate sensor in a rotational mode having controlled clockwise and counterclockwise peak dither angle amplitudes by applying electrical energy pulses of a predetermined energy quantity to a torquer for torquing the spring-mass system, and applying the pulses in a time relationship relative to the movement of the spring-mass system.

BRIEF DESCRIPTION OF THE DRAWINGS

FIG. 1 is a diagrammatic representation of a dither system employed in the prior art for a spring-mass system shown as a ring laser gyro.

FIG. 2 is a block diagram showing the closed-loop electromechanical oscillator of the system shown in FIG. 1.

FIG. 3a is a graphical representation of dither motion of an oscillated spring-mass system.

FIG. 3b is a graphical representation of synchronized torque command pulses of the present invention.

DETAILED DESCRIPTION OF THE INVENTION

Figure 4:
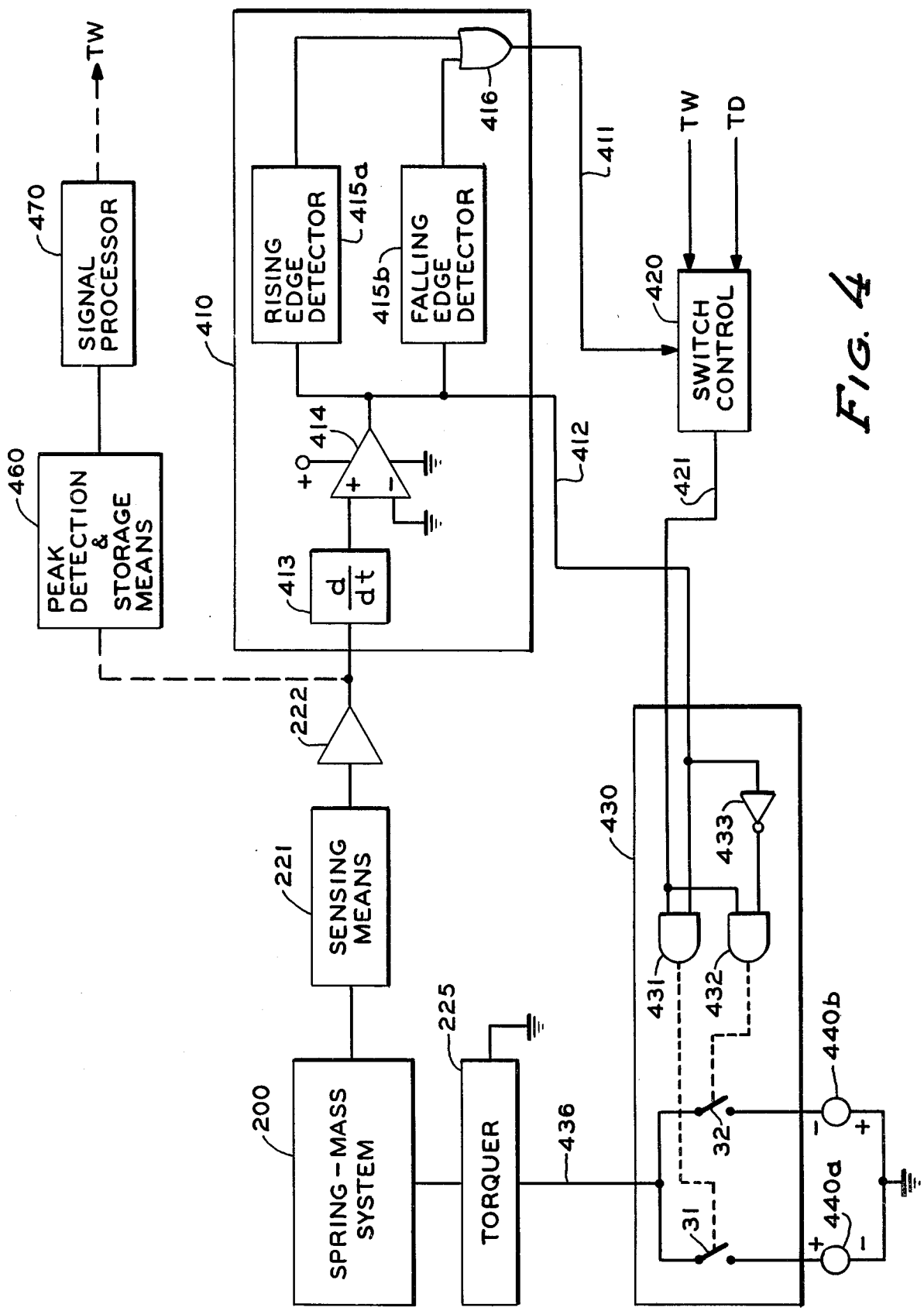
FIG. 4 is a block diagram of one embodiment of a dither system of the present invention.

A prior art dither system for oscillating a spring-mass system clockwise and counterclockwise in a rotational mode is shown in FIG. 1. FIG. 1 is substantially the drawing presented in U.S. Pat. No. 3,373,650 which shows the dither system for a laser angular rate sensor where the sensor is part of a spring-mass system. In FIG. 1, a laser beam medium 80 is shown supported on a rotatable base 82 which is mounted by means of three pegs 84, 86, and 88 to three leaf springs 92, 94, and 90 respectively which are in turn supported by three mounting blocks 96, 94, and 100 respectively. Blocks 96, 98, and 100 are securely fixed to a base 102 so that rotatable base 82 is suspended from the fixed base 102 by springs and may oscillate in a rotational mode, back and forth, as indicated by arrow 104. Also indicated in FIG. 1, is the ring laser closed-loop path provided by three mirrors 110 in which counter-traveling beams of light 106 and 108 travel therein.

In order to oscillate the moving base 82 in a circular or rotational fashion, an oscillator 120 is shown driving a torquing means including an electromagnet 122 so as to periodically attract and repel a block 124 which is attached to the end of leaf spring 90. The resulting back and forth motion of leaf spring 90 causes base 82 to rotationally oscillate so that the closed-loop path rotates thereby resulting in a varying frequency difference between the two waves for a majority of the time so as to reduce the effects of lock-in. The magnitude of the peak-to-peak rotation of the ring laser angular rate sensor system of FIG. 1 for satisfactory lock-in error reduction usually is less than several degrees, and typically less than 1 degree of rotation.

The resulting back and forth motion of base 82 relative to base 102 is commonly referred to as dither motion, and the ring laser gyro employing such motion is commonly referred to as a dithered ring laser angular rate sensor. The exemplary combination of base 82, base 102, and the resilient coupling means provided by leaf springs 90, 92, and 94 and corresponding mounting pegs and blocks is commonly referred to as a spring-mass system, and the means to oscillate base 82 in a rotational mode relative to base 102 is herein referred to as a dither motor system and, in the exemplary dither motor system of FIG. 1, includes oscillator 120, electromagnet 122 and block 124. The spring-mass system shown in FIG. 1 is only one example of a spring-mass system, and the invention of the present application is not restricted to the spring-mass system illustrated in FIG. 1.

The spring-mass system shown in FIG. 1 is a high-Q spring-mass system. A single pulse of energy applied to electromagnetic 122 attracting or repelling block 124 will cause the spring-mass system to oscillate at its resonant frequency, herein referred to as the natural resonant dither frequency. The frequency of oscillation of oscillator 120 and the strength of electromagnet 122 will more or less affect the frequency of oscillation of the spring-mass system and affect the peak-to-peak clockwise and counterclockwise dither angle amplitude. Dither angle is herein referred to as the angle of rotation, either clockwise or counterclockwise, measured from some fixed reference point when the spring-mass system is at rest.

Other techniques for providing a dither motor system for the spring-mass system shown in FIG. 1 are also taught in U.S. Pat. No. 3,373,650. It is suggested in U.S. Pat. No. 3,373,650 that an oscillator and an electromagnetic drive unit may be utilized on each of the three leaf springs, although only one is necessary. Another technique disclosed is to drive electromagnet 122 in response to a pick-off or rotation sensing means which provides a signal indicative of the rotation of base 82 and drives the electromagnet in accordance with a continuous amplified signal therefrom. In this way table 82 may be allowed to oscillate at its own natural resonant frequency, and, therefore, enjoy a more stable form of oscillation having neary equal peak dither angle amplitudes of rotation.

Present day laser angular rate sensors manufactured by the assignee of the present application utilize a dither motor system similar to the one just above for providing a dither motor system for a laser angular rate sensor which forms part of a spring-mass system. A practical implementation of the latter dither motor system may be accomplished by attaching piezoelectric devices to resilient means such as the leaf springs shown in FIG. 1 whereby an application of an appropriate voltage will cause torsional stress to the springs, flexing the springs, and causing rotational motion of the base 82 relative to base 102. Further, another piezoelectric device is attached to one of the leaf springs which acts as a rotation sensing means since such a piezoelectric device will provide an output signal indicative of the torsional stress caused by the flexing of the leaf spring forcibly caused by the application of energy to the first mentioned piezoelectric device. A schematic block diagram of such a dither motor system is shown in FIG. 2.

In FIG. 2, a spring-mass system like the combination of base 82 of the ring laser angular rate sensor shown in FIG. 1, base 102, and the interconnecting resilient coupling means provided by leaf springs 90, 92, and 94 is indicated by block 200. Coupled to the spring-mass system 200 is a sensing means 221 coupled to the spring-mass system for providing a signal indicative of the rotation of the spring-mass system. Sensing means 221, may be provided, by a piezoelectric device attached to one of the leaf springs indicated in FIG. 1 providing an output signal indicative of torsional stress on the spring which is related to rotation of the movable base 82. The sensing means 221 output signal is amplified by amplifier 222 and passed through a phase shifter 223. The output of phase shifter 223 is fed to an amplifier 224 which in turn has a continuous sinusoidal output voltage connected to torquer 225. Torquer 225 applies a sinusoidal torque to the spring-mass system 200, which in turn, the effect thereof, is detected by sensing means, 221. Torqurer 225 may be, by example, a piezoelectric device also attached to one or more of the leaf springs indicated in FIG. 1 which flexes the leaf spring. Use of a piezoelectric device for torquer 225 typically would require that amplifier 224 be a high voltage amplifier. Torquer 225 could also be the electromagnet 124 shown in FIG. 1, and would not necessarily require the high voltage amplifier.

The dither motor system presented in FIG. 2 provides essentially an electromechanical oscillator. An appropriate adjustment of phase shifter 223 is required for oscillation at the natural resonant dither frequency of the spring-mass system as is well known in the art. That is to say, that once the spring-mass system is momentarily perturbed, usually by random noise, phase shifter 223 will provide regenerative positive feedback so that the spring-mass system 200 oscillates having a substantially constant clockwise and counterclockwise peak dither angle amplitude substantially determined by the gain of the amplifiers. The mechanical losses of such a system equals the system gain. If the gain is increased by gain adjustment of amplifier 222 or amplifier 224, the system will oscillate, still at the natural resonant dither frequency, but will have a different peak-to-peak dither angle amplitude. With appropriate design of such a spring-mass system, particularly, being symmetrical and balanced, the dither angle amplitude will be such that the peak clockwise and the peak counterclockwise dither angle amplitudes will be equal. Further, the rotational motion provided will be nearly sinusoidal at the natural resonant frequency of the spring-mass system as indicated graphically in FIG. 3a by curve 300, which is a plot of dither angle amplitude versus time for a couple of dither cycles. Note that a high-Q spring-mass systems requires little energy to maintain oscillation thereof.

It is the subject of the present application to provide a dither motor system for oscillating a spring-mass system in a rotational mode having controlled clockwise and controlled counterclockwise peak dither angle amplitudes in response to a dither angle amplitude control signal. Referring to FIG. 3, the object of the present application is to provide a dither motor system for controlling the values of the positive and negative dither angle amplitudes as indicated pictorially by points 331, 332, and 333. The dither motor system of the present invention for providing peak dither angle amplitude control is substantially shown in the block diagram shown in FIG. 4.

In FIG. 4, similar functioning blocks as those shown in FIG. 2 have the same numeral designations in FIG. 4 as those in FIG. 2 and will not be described further. Referring now to FIG. 4, sensing means, 221, is again coupled to spring-mass system 200, having an output amplified by amplifier 222. The output of amplifier 222 is essentially a signal indicative of the rotation of spring-mass system 200. The output of amplifier 222 is presented to signal processor 410 having a first output signal 411 indicating the occurrence of a change of direction of said spring-mass system, and a second output signal 412 indicating the rotation direction of the spring-mass system (clockwise or counterclockwise). The first output signal 411 is presented to a switch control 420. Switch control 420 receives as an input and external amplitude control signal as will be further explained. The output of switch control 420, indicated by output signal 421, is presented to switch means 430. Switch means 430 has as inputs the second output signal 412 of signal processor means 410 and constant polarity power sources 440a and 440b. Power sources 440a and 440b are shown in FIG. 4 as constant polarity voltage sources with one pole of each source of opposite polarity being in common to ground. The remaining pole of each source, of course being of opposite polarity, being connected to torquer 225 through switches 31 and 32 respectively. As will be shown, switch means 430, controlled by switch control 420 selectively connects and disconnects one of power sources 440a and 440b to torquer 225 which in turn torques spring-mass system 200 in a direction determined by the polarity of the power source chosen.

Signal processor 410 is shown diagrammatically in FIG. 4 including a time differentiation circuit 413 for differentiating the amplified sensing means 221 output signal being indicative of the dither angle amplitude. The output of differentiation circuit 413 is an output signal indicative of dither rotation rate and the polarity thereof is indicative of rotation direction. The output of differentiator 413 is fed into a comparator 414. The output of comparator 414, designed as output signal 412, being a high or low voltage signal corresponding to the dither rotation direction, clockwise or counter-clockwise, of spring-mass system 200. The output of comparator 414 is further processed by rising edge detector 415a and falling edge detector 415b. The output of rising edge detector 415a and falling edge detector 415b is operated on by OR circuit 416 providing output signal 411 and provides essentially a SYNC pulse for each occurrence of either a rising edge or a falling edge of the output of comparator 414, such occurrences corresponding to those instances when the dither rotation direction of spring-mass system 200 reverses.

The main function of signal processor 410 is to provide a rate detection means for monitoring the movement of spring-mass system 200. At instances of rotation direction reversal of the spring-mass system, the rate of movement is zero. This condition is indicated by the output of comparator 414 reversing state. Various combinations of edge detectors and one or more comparators above that which is shown in FIG. 4 can be utilized for providing signals of a selected condition of motion of spring-mass system 200 other than the zero rate condition exemplified therein.

Switch means 430 combines the output of switch control 420 and the rotation direction signal provided by output signal 412 for selectively connecting one of power sources 440a and 440b to torquer 225 for a selected time duration. Switch means 430 is diagrammatically shown consisting of AND gates 431 and 432, their outputs controlling switches 31 and 32 respectively. Switches 31 and 32 can be any of a variety of electromechanical or solid state switches controlled by the output of AND gates 431 and 432.

Two input AND gates 431 and 432 each has a first input connected to the output signal 421 of switch control 420. AND gate 431 has a second input electrically connected to output signal 412 and AND gate 432 has a second input connected to output signal 412 through logic inverting means 433.

The operation of switch means 430 will now be described. The logical state or voltage level of output signal 412 is representative of the direction of rotation of the spring-mass system and selectively enables AND gate 431 or 432. Whenever output signal 421 is a logical one, one of AND gates 431 or 432 will be enabled dependent on output signal 412 and subsequently will close one of switches 31 and 32. With switch 31 closed, the positive pole of source 440a is connected to torquer 225, whereas with switch 32 closed, the negative pole source 440b is connected to torquer 225. As will be further described below, output signal 421 essentially controls the time duration that either of power sources 440a and 440b is connected to torquer 225. The output of switch means 430 provides torque command pulses of energy applied to torquer 225 on output terminal means 436 controlled by switch control 420. The polarity of the applied source, applied intermittently, determines the direction of torque, clockwise or counter-clockwise.

Note that the combination of switch means 430 and power source 440a and 440b could have been provided in a variety of ways to obtain the intended function, and therefore the invention of the present application is not restricted to the switch means shown in FIG. 4. Particularly, a single constant polarity power source could have been used in combination with a pair of controllable double pole switches as would be known to those skilled in the art.

The function of switch control means 420 will now be described with reference to FIGS. 3a and 3b. Switch control means 420 primarily controls AND gates 431 and 432, whichever is enabled by output signal 412, for a time duration substantially determined by an external peak dither angle amplitude control input signal, TW. Control input signal TW can be considered in the following discussion to be an independent variable such as a fixed set point signal which can be independently changed. On the other hand, control input signal TW could be part of a closed-loop feedback system where TW varies in response to past performance of some other continuously changing variable as will be discussed below. It is the object of the present invention to provide a dither system responsive to selected values of TW and provide a corresponding dither peak amplitude. The output signal 421 of switch control 420 is synchronized with the change in direction of the spring-mass system 200 provided by the SYNC pulses provided by output signal 411.

Referring now to FIGS. 3a and 3b, FIG. 3b is a graphical representation of torque command pulses applied to torquer 225 as determined by switch means 430 and switch control means 420. The pulses are shown as alternating positive and negative voltage pulse having a selected pulse width. FIG. 3a is a graphical representation of the resultant dither angle due to the torque command pulses. The intended function of switch control 420 is to synchronize the application of the torque command pulses in a time relationship with the movement of the spring-mass system. Particularly, it is desirable to provide torque command pulses to the torquer which are centered about the instant of time that the spring-mass system dither angle is zero. That is to say, that the pulses are centered between the peak clockwise dither angle amplitude and the peak counter-clockwise dither angle amplitude. Shown in FIG. 3b, are torque command pulses 338, 339, and 340 which precede the positive peak dither angle amplitude 331, the negative peak dither angle amplitude 332, and the positive peak dither angle amplitude 333 respectively. Each of the torque command pulses shown in FIG. 3b are centered substantially between the peak positive and negative dither angle amplitudes.

Consider the situation where a succession of torque command pulses, similar to those shown in FIG. 3b, have been applied to torquer 225. In these circumstances, the spring-mass system will oscillate in a rotational mode having equal positive and negative peak dither angle amplitudes as indicated by curve 300 in FIG. 3a. Noted on curve 300 are the equal amplitudes indicated by numerals 331, 332, and 333. Each of the torque command pulses shown in FIG. 3b represents a quantity of electrical energy applied to torquer 225 which in turn applies a quantity of mechanical energy to the spring-mass system for torquing thereof. If the pulse width of a torque command pulse is changed while maintaining the amplitude constant the peak dither angle amplitudes will change in proportion to the amount of energy applied. Similarly, if the width is held constant while changing the magnitude of the pulse, the peak dither angle amplitudes can also be modified. Thus, control of either pulse amplitude or pulse width provides individual control of the peak dither angle amplitudes.

The torque command pulses shown in FIG. 3b alternate in polarity so as to provide a torque to the spring-mass system in the direction of rotation that the spring-mass system was rotating before the pulse was applied. The output signal 412 in combination with AND gates 431 and 432 synchronizes the connection of either of power sources 440a and 440b for applying the appropriate voltage polarity pulse to torquer 225 so as to torque the spring-mass system in the direction of rotation as aforesaid. Of course, the choice for torquer 225 determines the type of pulse, constant polarity or alternating polarity, required for operation. For a piezoelectric device used as torquer 225, an alternating polarity pulse is usually required. Other choices of torquer 225 are, of course, possible and are within the scope of the invention.

Consider the response of the spring-mass system to a succession of alternating polarity torque command pulse applied to torquer 225 like those shown in FIG. 3b but where pulse 339 is suddenly increased in width by a value equal to TI, indicated by pulse 339' and is still centered between the peak positive and negative dither angle amplitudes. In this situation, the negative dither angle amplitude will increase as indicated by negative dither angle amplitude 332'. If pulse 340 is not changed in pulse width, that is, being the same width as pulse 339, the next positive peak dither angle will be the positive peak dither angle indicated by numeral 333 plus some increment as indicated by the peak dither angle 333'. This is so, since it is assumed that the spring-mass system has a high-Q and thus very low damping. This means that the increased energy provided by pulse 339' will affect subsequent positive and negative peak dither angle amplitudes. Because of some loss in the spring-mass system, the increment in the negative dither angle amplitude from 332 to 332' resulting from pulse 339' will be greater than the increment occurring in the next positive dither angle amplitude from 333 to 333'.

The response just described relative to the change in pulse width of pulse 339 is the transient response of a spring-mass system to changes in the pulse width of the synchronized pulses such as 338, 339, and 340. If the transient response of the spring-mass system is known, the pulse width TW of each pulse occurring before the next occurring positive or negative peak dither angle can be controlled so as to produce a desired peak dither angle amplitude following the pulse. In the example illustrated in FIGS. 3a and 3b, the pulse width of pulse 340 following the new pulse 339' could have been decreased by a finite width so as to correct for the affect of the increase in pulse width of pulse 339 so that the peak positive dither angle following the torque command pulses 339' and pulse 340 is controlled to some predetermined value. Note that pulse 340 could also be made negative in polarity so as to virtually eliminate the positive value of dither angle following the negative pulse in place of pulse 340. In this situation, direct control of AND gates 431 and 432 is required as opposed to synchronous control thereof provided by output signal 412.

Referring again to FIG. 4, switch control means 420 synchronizes the enabling of AND gates 431 and 432 where the AND gates are enabled at a time after the SYNC pulse provided by output signal 411 at a start time substantially described by:

$$T(start) = TD/4 - TW/2$$

and a stop time substantially described by:

$$T(stop) = TD/4 + TW/2$$

where TW is the desired width of the individual torque command pulse, and TD is an estimate of the dither period of the natural resonant frequency of the spring-mass system.

Switch control means 420 in combination with switch means 430 provides torque command pulses such as those indicated by pulses 338, 339, and 340, in FIG. 3b having pulse width TW being synchronized with the dither motion of the spring-mass system since the SYNC pulses provided by output signal 411 is time related to a selected movement of the spring-mass system, that movement being in the particular embodiment of FIG. 4, the zero rate movement of the spring-mass system, i.e. at rotation direction reversal.

There are many possible control schemes for determining the proper value of the variable control signal, TW, applied to switch control means 420 for obtaining the desired response of the spring-mass system, namely the desired peak dither angle amplitudes, both positive and negative. Such control schemes may include, among others, knowledge of the transfer function of the spring-mass system or use of predictor control schemes based on past history of the response of the spring-mass system to previous torque command pulses applied thereto. One predictor control scheme using knowledge of the past history is indicated in FIG. 4 by the control loop indicated by the long dashed line connected system blocks.

One example of a predictor type of control scheme is one in which the last two successive peak dither angles are compared and corrected for the last incremental change in pulse width in order to estimate the following peak dither angle if the next pulse applied is the same as the previous pulse without the pulse width increment. From this information, a new incremental pulse width value is determined in order to obtain a new desired subsequent peak dither angle.

The new incremental pulse width value can then be added to some nominal pulse width value, the sum being the control signal value TW. In this manner, the previous history of the peak negative and positive dither angles is utilized for obtaining a value for the next incremental change in the pulse width for obtaining desired positive and negative peak dither angles.

The control scheme shown in long dashed lines in FIG. 4 provides such a control scheme as was just presented. The output of amplifier 222 is connected to a peak detection and storage means 460, the output of which is connected to signal processor 470. Signal processor 470 receives as inputs the value of the next desired positive peak dither angle, Ap, or the next desired negative peak dither angle, An. Peak detection and storage means 460 responds to the output signal of amplifier 222 which is a signal indicative of the dither angle of the spring-mass system 200. The peak detection storage means temporarily stores the peak dither angle value for each direction of rotation of spring-mass system 200.

Signal processor 470 computes the value of the next desired pulse width to obtain the next desired peak dither angle Ap or An based on the change in the previous peak dither angles to obtain the value TW.

Figure 5:
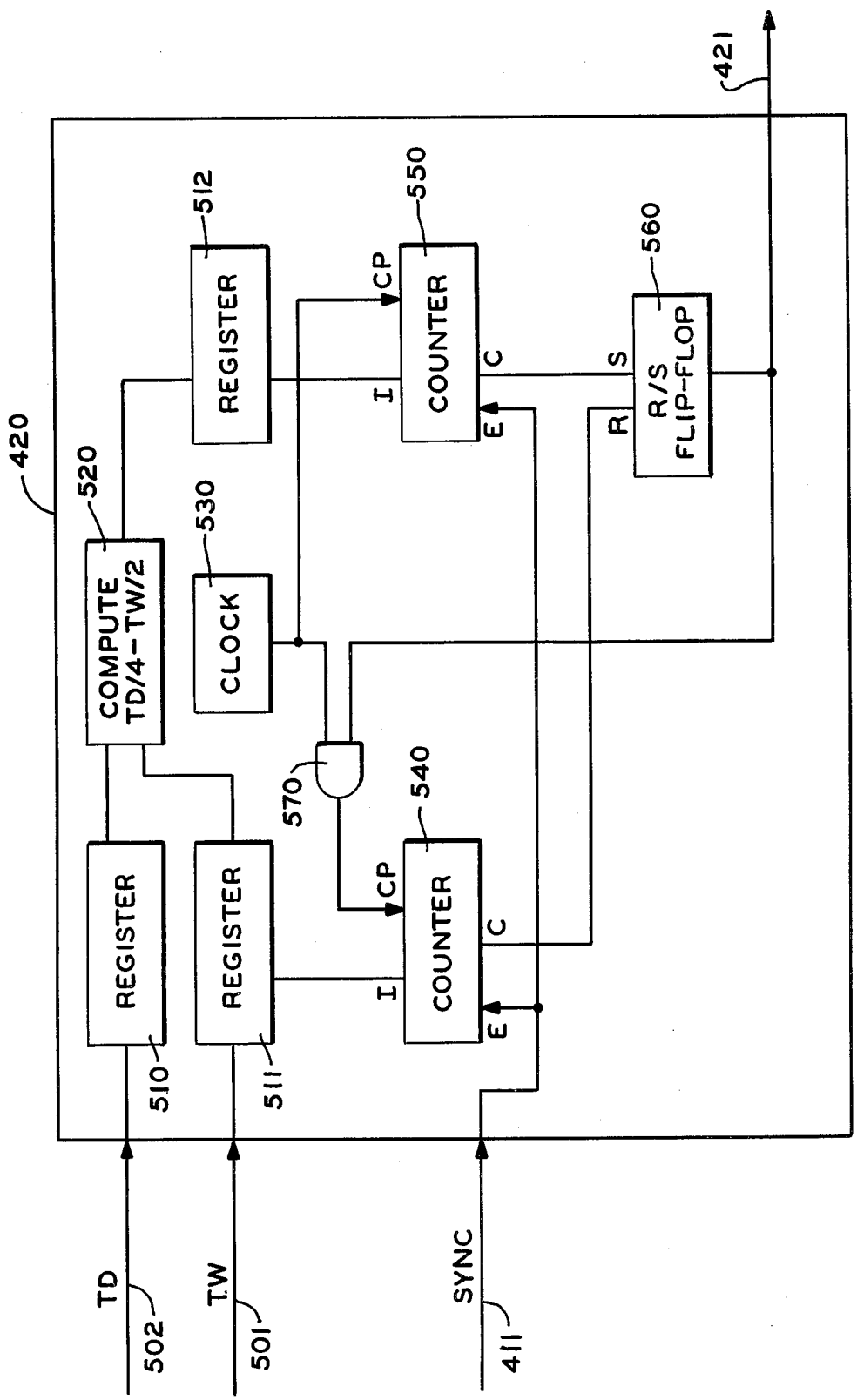
FIG. 5 is a block diagram showing the implementation of the switch control block shown in FIG. 4.

One example of switch control 420 of FIG. 4 is shown in detail in FIG. 5. Switch control means 420 provides the output signal 421 for controlling switch means 430 so as to provide torque command pulses to torquer 225 shown in FIG. 4. These torque command pulses have a finite pulse width, TW, and are synchronized in a time relationship with the movement of the spring-mass system 200. The block diagram shown in FIG. 5 is just one example of obtaining the intended function of switch control 420 as aforesaid.

Switch control means 420 shown in FIG. 5 includes a plurality of storage registers, 510, 511, and 512, a computing means 520, a clock means 530, countdown counters 540 and 550, and an R/S flip-flop 560, and a two-input AND gate 570.

Countdown counters 540 and 550 are clocked downward by clock pulses at the input terminal, CP, of each counter. Counter 540 is clocked downward by clock means 530 through AND gate 570, and counter 550 is clocked down directly from clock means 530. Counter 540 has input terminal means, I, adapted to receive a digital word from register 511 and counter 550 has input means, I, adapted to receive a digital word from register 512. Each of the counters are set to the values of the digital word at its respective input upon an enabling clock pulse at their respective enabling input terminal, E. As is shown in FIG. 5, the enabling input terminals E of each countdown counter 540 and 550 are connected in common and connected to the output signal 411, which is the SYNC pulse as already described with respect to FIG. 4.

The output of counter 550, C, is connected to the set-input (S) of flip-flop 560, and the output of counter 540, C, is connected to the Reset-input (R) of R/S flip-flop 50. The output of R/S flip-flop 560 is the output signal 421 as indicated in FIGS. 4 and 5.

The operation of the switch control means 420 shown in FIG. 5 will now be described. Register 511 is presented with a digital word representative of the next desired pulse width, TW, of the next desired torque command pulse, and register 510 is presented with a digital word representative of the natural dither period of the spring-mass system, and each are temporarily stored therein. The outputs of registers 510 and 511 are presented to computing means 520 for calculating a delay time which establishes a time relationship between the SYNC pulse provided by output signal 411 and the beginning of the torque command pulse. The value of the start time is substantially described by:

TD/4−TW/2.

The output of the computation is converted to a digital representation of the start time and is stored and registered 512.

Refer now to FIG. 4 and FIG. 5 and assume that a value of TW has been already stored in register 511 and the start time has been computed and stored in register 512. Further assume that the spring-mass system 200 has rotated in a positive direction and is just at the instant of turnaround or rotation direction reversal. In these circumstances the output of differentiator 413 changes from a positive value to a zero value reversing the state of comparator 414 and is detected by falling edge detector 415b which in turn causes an output pulse from OR gate 416 on output signal 411, the SYNC pulse. The SYNC pulse is applied to both counters 540 and 550 allowing them to be enabled and set to the digital words representative of TW and T(start) respectively stored in registers 511 and 512 respectively. Shortly thereafter counter 550 begins to count downward for each clock pulse provided by clock means 530. Counter 540 is unable to clock down since the output of the R/S flip-flop is a logical zero in these circumstances. When the counter 550 is clocked down to zero, the output, C, changes state from a logical zero to a logical one at which time counter 550 is disabled. The change in state of output C to a logical one, sets flip-flop 560 causing the output thereof to be a logical one, resulting in the output signal 421 to change from a logical zero to a logical one.

In turn, the output of R/S flip-flop 560 enables AND gate 570 to allow counter 540 to receive clock pulses from clock means 530 and cause counter 570 to count downward. While counter 540 is clocking downward the output of R/S flip-flop 560 and output signal 421 remain a logical one. When counter 540 counts down to zero, the output terminal C thereof changes state from a logical zero to a logical one at which time counter 570 is disabled. The change in state of output C of counter 570 to a logical one resets R/S flip-flop 560 causing the output thereof to return to a logical zero. Thus, the output signal 421 of switch control means 420 is a series of pulses having a finite width, TW, each pulse beginning a predetermined delay time after the SYNC pulse. In combination with the system shown in FIG. 4, the SYNC pulse begins a predetermined time after the occurrence of the spring-mass system changing direction. If the value of TD, provided as an input to switch control 420, is substantially the natural dither period, the torque command pulse will be centered substantially between the positive and negative peak diether angle amplitudes.

Placement of the pulses applied to torquer 225 in FIG. 4 are substantially centered midway between the positive and negative peak dither angle amplitudes providing a maximum linear relationship between a change in peak dither angle amplitude for a change in pulse width. The delay period, TD, presented to switch control means 420 in FIG. 5 determines the centering of the pulses applied to torquer 225. Switch control means 420, as indicated earlier, is dependent upon a signal indicative of the resonant dither period, TD. Small variations in the value of TD supplied to switch control means 420 compared with the true resonant dither period of the natural dither frequency will cause a small variation in the linearity between the change in amplitude versus a change in pulse width, however the spring-mass system will substantially oscillate at the natural dither frequency. The predictor control scheme, discussed above, tends to take the non-linearity into consideration for obtaining the value of the next torque command pulse width based on past history of the performance of the spring-mass system for the last subsequent pulse applied thereto. Further improvements (not shown) to that presented in FIGS. 4 and 5 can be obtained by providing determined values of the period of the natural resonant dither frequency by measurement of time between changes in direction of the spring-mass system obtained from information provided by the sensing means 221, or other similar functioning device.

It is within the scope of the present invention that the torque command pulses may have a different time relationship than that as already described. For example, computing means 520 in FIG. 5 can be altered so that the torque command pulse may be started much before or much after the SYNC pulse. Further, the SYNC pulse itself may be obtained from a different movement characteristic other than the instant of direction turnaround as indicated in the above discussion.

Also, selective control of the input value of TD applied to the switch control means 420, and/or selective changes in the computation provided by computing means 520 whereby pulses are applied shortly after the occurrence of the peak dither angle will affect the actual dither frequency to be a value other than the natural dither frequency.

The system of FIG. 4 can be easily modified to provide controlled amplitude constant pulse width torque command pulses in time relationship to the movement of the spring-mass system. Such control may be accomplished by replacing constant polarity power sources 440a and 440b with command driven variable power sources, not shown, and providing constant TW and TD signals to switch control means 420. In this system, each clockwise and counterclockwise peak dither angle amplitude can be individually varied by appropriate polarity and amplitude control of the variable power sources amplitude, but still be synchronous with a selected movement of the spring-mass system.

Laser angular rate sensors, which of course provide information of rotation thereof, typically contains a lock-in angular error signal which is dependent upon the instantaneous phase angle between the counter-traveling beams. Lock-in error has been substantially reduced in such sensor by dithering the sensor as aforesaid, and shown in FIGS. 1 and 2. It has been found that lock-in error is related to this instantaneous phase angle as noted in U.S. Pat. No. 4,243,324 and U.S. Pat. No. 4,248,534 by Fridland and Elbert, respectively. The phase angle between the two counter-traveling beams can be obtained from photodetector output signals associated with well known ring laser gyros for obtaining information indicative of the rotation thereof. Control schemes responsive to the phase angle between the counter-traveling beams can be utilized for direct control of the positive and negative peak dither angles for affecting succeeding phase angles at selected values of phase angle rates of change which are related to the rotation of the sensor such that lock-in error can be substantially reduced. A system employing these principles is shown in FIG. 6.

Figure 6:
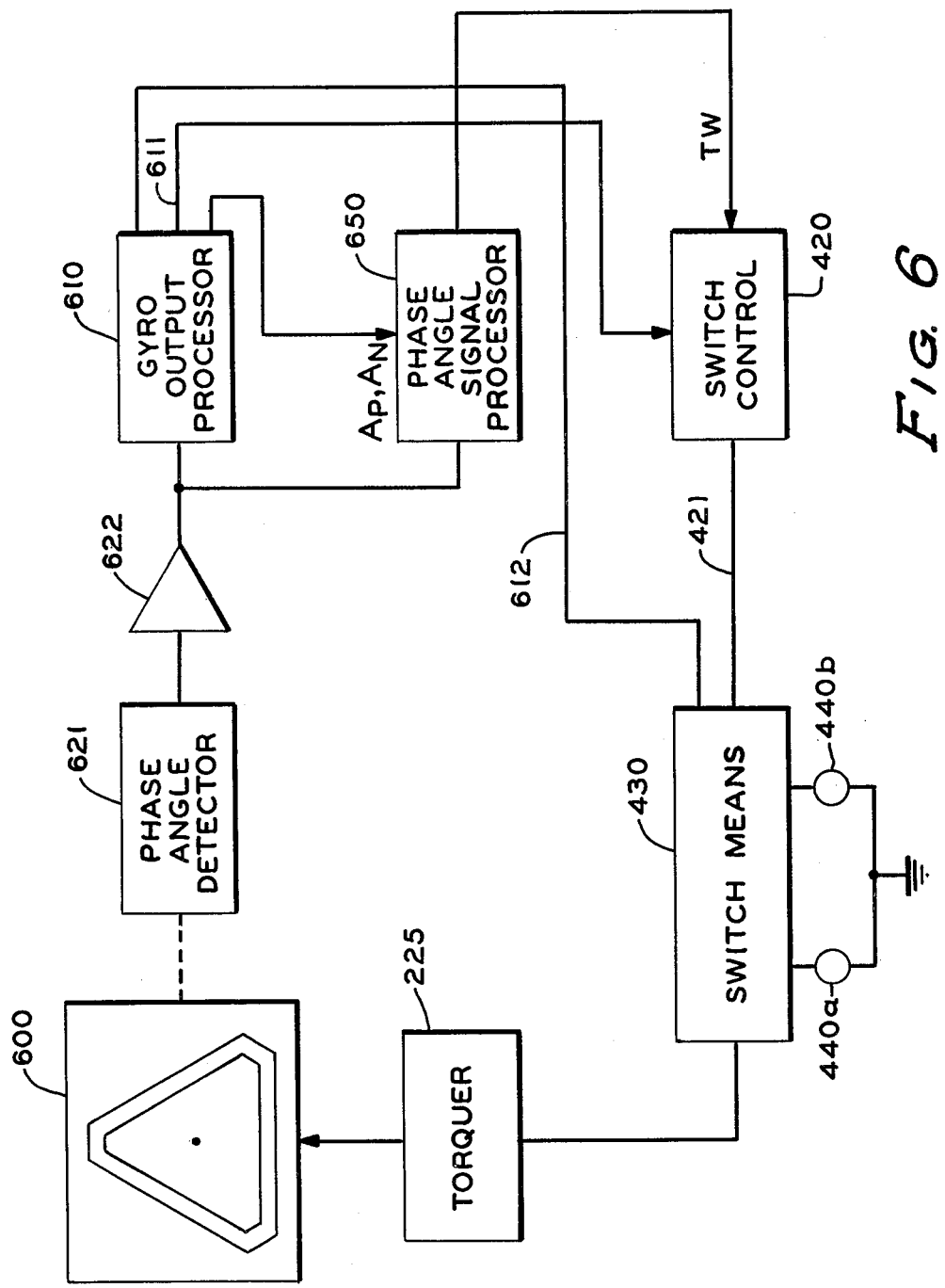
FIG. 6 is a diagrammatic representation of a dither system of the present invention for a ring laser gyro.

FIG. 6 is another embodiment of the invention similar to the system shown in FIG. 4. The spring-mass system 200 of FIGS. 2 and 4 is replaced by ring laser gyro 600 similar to that described in FIG. 1. Sensing means 221, amplifier 222, and signal processor 410 are replaced by similar function blocks indicated by phase angle detector 621, amplifier 622, and laser gyro output processor 610 having output signals 611 and 612. Torquer 225 is coupled to the spring-mass system of ring laser gyro 600. Switch control means 420, switch means 430 and power sources 440a and 440b are again provided in the system shown in FIG. 6 providing the same functions as in FIG. 4 but wherein output signal 411 is provided by output signal 611 and output signal 412 is provided by output signal 612.

In FIG. 6, phase angle detector 621 is coupled to the laser angular rate sensor 600 for detecting the instantaneous phase angle between the counter-traveling beams of the ring laser sensor. The output of phase angle detector 621 can be then amplified by amplifier 622. The output of amplifier 622 is coupled to laser gyro output processor 610 for obtaining rotational information including signals indicative of direction of rotation of ring laser gyro 600 and also provide a signal indicative of a change in direction thereof. Phase angle detector 621 is well known in laser gyro art and usually consists of a photodetector which measures the intensity of an interference pattern created by the combined portion of the intensity of the counter-traveling beams in the ring laser gyro. Ring laser gyro output processor 610 is well known in the art and usually is a means for counting maximums of the interference pattern as it moves past the detector at a rate proportional to the sensed rotation. Ring laser gyro output processor 610 provides the rate of rotation, direction of rotation, and angle of rotation information in a well known manner. From this information ring laser output processor 610, shown in FIG. 6, provides output signal 611 indicative of a change in direction of gyro 600 and output signal 612 indicative of rotation direction of the sensor corresponding to similar output signals 411 and 412, respectively, provided by signal processor 410 shown in FIG. 4 in a similar manner as signal processor 410.

Also shown in FIG. 6, is a phase angle signal processor 650, having as input signals (i) the output of phase angle detector 621 indicative of the instantaneous phase angle between the counter-traveling beam provided by the output of amplifier 622; and (ii) an output signal of ring laser gyro output processor 610 indicative of past positive and negative peak dither angle amplitudes as determined by ring laser gyro output processor from the output of phase angle detector 621. These latter mentioned signals are combined in signal processor means 650 in a manner so as to provide an output signal, TW, indicative of the next desired torque command pulse. In turn, the TW signal is presented as the TW input to switch control 420 in FIG. 4 or can provide control signals for control of variable controlled power sources (not shown) in conjunction with an alternate switch means 430 indicated earlier.

Signal processor 650 is similar to signal processor 470, and determines values of TW. Processor 650 provides a means for determining first a desired next occurring phase angle between the counter-traveling beams at the next instance of direction reversal of the counter-traveling waves brought about by the oscillating motion caused by the dither system, the next desired phase angle being such so as to cause the lock error in the output to be reduced. Secondly, processor 650 obtains values of Ap and An, positive and negative desired peak dither angles respectively, being functions of the desired phase angle. Lastly, processor 650 determine the next value of TW in a manner described with respect to processor 470, for obtaining the desired values of Ap and An.

The output of signal processor 650 being indicative of the value TW of the next desired pulse width of the next torque command pulse is presented to switch control means 420, switch cotrol means 420 providing the intended function as already described in combination with switch means 430, torquer 225, and the spring-mass system here being ring laser gyro 600.

In operation, the ring laser gyro 600 is dithered in a manner so as to reduce the lock-in error in the sensors output. Command torque pulses are applied to torquer 225 to oscillate ring laser gyro 600 so as to have determined values of both positive and negative peak dither angle amplitudes based on the instantaneous phase angle between the counter-traveling laser beams whereby lock-in error in the sensors output is reduced.

It should be understood by those skilled in the art that various changes and omissions in the form of details of the invention may be made without departing from the spirit and the scope of the invention.

The embodiments of the invention in which an exclusive property or right is claimed are defined as follows:

1. A dither motor system for oscillating a spring-mass system in a rotational mode having controlled clockwise and counterclockwise peak amplitudes of rotation in response to an amplitude control signal, the dither motor system comprising:
   pulsing means responsive to said amplitude control signal for providing torque command pulses synchronized to a selected condition of motion of said spring-mass system, said torque command pulses having a magnitude of electrical energy directly related to said amplitude control signal;
   torquing means coupled to said spring-mass system for applying a controlled torque to said spring-mass system so as to separately control said clockwise and counterclockwise rotations of said spring-mass system, said torquing means having input terminal means adapted to receive said torque command pulses wherefrom the magnitude of said controlled torque is substantially determined.

2. The apparatus of claim 1 wherein said pulsing means includes switch control means responsive to the motion of said spring-mass system for synchronizing said torque command pulses in time relationship to rotation direction reversals of said spring-mass system such that each of said torque command pulses are centered substantially midway between each peak clockwise amplitude of rotation and peak counterclockwise amplitude of rotation of said spring-mass system.

3. The apparatus of claim 1 wherein said pulsing means comprises:
   rate detection means responsive to the movement of said spring-mass system and providing an output signal having a selected signal change upon a selected condition of motion of said spring-mass system;
   switch means having terminal means adapted to receive switch command signals for selectively connecting and disconnecting an electrical power source means to said torquing means so as to provide said torque command pulses; and
   switch control means responsive to said rate detection means output signal for generating first and second switch command signals for connecting and disconnecting, respectively, said electrical power source to said torquing means input terminal means, said first switch command signal being generated a selected time after said selected change in signal of said rate detection means output signal thereby synchronizing said torque command pulses to said selected condition of motion of said spring-mass system.

4. The apparatus of claim 3 wherein:
   said power source means includes at least one constant polarity variable magnitude power source having a power control terminal adapted to receive said amplitude control signal for controlling the magnitude of said variable magnitude power source so as to control the peak clockwise and counterclockwise amplitudes of rotation;
   said switch control means includes means for generating a second switch command signal for disconnecting said power source from said torquing means input terminal means a selected time after said first switch command signal.

5. The apparatus of claim 3 wherein said power source means includes at least one constant polarity, substantially constant magnitude power source.

6. The apparatus of claim 3 wherein said switch control means includes:
   means for generating said first switch command signal said selected time as a function of said amplitude control signal, and means for generating a second switch command signal for disconnecting said power source means from said torquing means input terminal a controlled time after said first switch command signal, said controlled time being related to said amplitude control signal.

7. The apparatus of claim 6 wherein:
   said power source means provides a substantially constant magnitude source of power, said power source means including means for selectively providing electrical power of a first and second polarity; and
   said switch means including means for alternately selecting one of said power source means first and second polarities for connection to said torquing means input terminal means on command of said first switch command signals so that said spring-mass system oscillates in a rotational mode.

8. The apparatus of claim 3, 4, 6, or 7 wherein said rate detection means includes means for providing said selected signal change at substantially each instant that said spring-mass system changes rotation direction from a first rotation direction.

9. The apparatus of claim 3, 4, 6, or 7 wherein said switch control means includes means for providing said first and second command signals such that each of said torque command pulses is centered substantially about the instant of time between the peak clockwise amplitude of rotation and the peak counterclockwise amplitude of rotation so that said spring-mass system oscillates in a rotational mode at its natural resonant frequency.

10. A dither motor system for oscillating a ring laser angular rate sensor suspended by a plurality of springs from a support, wherein the oscillations of the sensor are in a rotational mode having controlled clockwise and counterclockwise peak amplitudes of rotation in response to an amplitude control signal, the dither motor system comprising:
   pulsing means responsive to said amplitude control signal for providing torque command pulses synchronized to a selected condition of motion of said oscillating sensor, said torque command pulses having a magnitude of electrical energy directly related to said amplitude control signal;
   torquing means coupled to said angular rate sensor for applying a controlled torque to said sensor so as to separately control said clockwise and counterclockwise rotations of said sensor, said torquing means having input terminal means adapted to receive said torque command pulses wherefrom the magnitude of said controlled torque is substantially determined.

11. The apparatus of claim 10 wherein said pulsing means includes switch control means responsive to the motion of said angular rate sensor for synchronizing said torque command pulses in time relationship to rotation direction reversals of said sensor such that each of said torque command pulses are centered substantially midway between each peak clockwise amplitude of rotation and peak counterclockwise amplitude of rotation of said sensor.

12. The apparatus of claim 10 wherein said pulsing means comprises:
   rate detection means responsive to movement of said angular rate sensor for providing an output signal having a selected signal change upon a sensor;
   switch means having terminal means adapted to receive switch command signals for selectively connecting and disconnecting an electrical power source means to said torquing means so as to provide said torque command pulses; and
   switch control means responsive to said rate detection means output signal for generating first and second switch command signals for connecting and disconnecting, respectively, said electrical power source to said torquing means input terminal means, said first switch command signal being generated a selected time after said selected change in signal of said rate detection means output signal thereby synchronizing said torque command pulses to said selected condition of motion of said sensor.

13. The apparatus of claim 12 wherein:
   said power source means includes at least one constant polarity variable magnitude power source having a power control terminal adapted to receive said amplitude control signal for controlling the magnitude of said variable magnitude power source so as to control the peak clockwise and counterclockwise amplitudes of rotation;
   said switch control means includes means for generating a second switch command signal for disconnecting said power source from said torquing means input terminal means a selected time after said first switch command signal.

14. The apparatus of claim 12 wherein said power source means includes at least one constant polarity, constant magnitude power source.

15. The apparatus of claim 12 wherein said switch control means includes:
   means for generating said first switch command signal said selected time in response to said amplitude control signal, and means for generating a second switch command signal for disconnecting said power source means from said torquing means input terminal a controlled time after said first switch command signal, said controlled time being related to said amplitude control signal.

16. The apparatus of claim 15 wherein:
   said power source means provides a substantially constant magnitude source of power, said power source means including means for selectively providing electrical power of a first and second polarity; and
   said switch means including means for alternately selecting one of said power source means first and second polarities for connection to said torquing means input terminal means on command of said first switch command signals so that said spring-mass system oscillates in a rotational mode.

17. The apparatus of claim 12, 13, 15, or 16 wherein said rate detection means includes means for providing said selected signal change at substantially each instant that said sensor changes rotation direction from a first rotation direction.

18. The apparatus of claim 12, 13, 15, or 16 wherein said switch control means includes means for providing said first and second switch command signals such that each of said torque command pulses is centered substantially about the instant of time between each peak clockwise amplitude of rotation and peak counterclockwise amplitude of rotation so that said sensor oscillates in a rotational mode at its natural resonant frequency.

19. The apparatus of claim 6 or 15 wherein said switch control means includes:
   means adapted to receive a first data signal related to the period of the natural resonant frequency of the spring suspended sensor;
   means adapted to receive said control signal related to the desired amplitude of rotation of a selected one of a future occurring clockwise and counterclockwise peak amplitude of rotation;
   timing means responsive to said first data signal and said control signal for providing said first and second switch command signals, said first switch command signal being generated a first switch time interval after said selected change in signal of said rate detection means output signal, said first switch time interval being directly related to said first data signal, and said second command signal being generated a second switch time interval after said first switch command signal, said second switch time interval being directly related to said control signal thereby synchronizing said torque command pulses to said selected condition of motion of said sensor.

20. The apparatus of claim 12 wherein said rate detection means includes means for providing said selected signal change at substantially each instant that said sensor changes rotation direction from a first rotation direction.

21. The apparatus of claim 10 wherein:
   said ring laser angular rate sensor includes two beams of light substantially traveling about a closed-loop path and there being a phase relationship established between said beams which is a function of the rate rotation of said sensor; and
   said pulsing means includes
      rate detection means responsive to said phase relationship between said two beams of light of said ring laser angular rate sensor for providing an output signal having a selected signal change upon a selected condition of the rate of change of said phase relationship,
      switch means having terminal means adapted to receive switch command signals for selectively connecting and disconnecting an electrical power source means to said torquing means so as to provide said torque command pulses, and
      switch control means responsive to said rate detection means output signal for generating first and second switch command signals for connecting and disconnecting, respectively, said electrical power source to said torquing means, said first switch command signal being generated a selected time after said selected change in signal of said rate detection means output signal thereby synchronizing said torque command pulses to said selected condition of said rate of change of said phase relationship.

22. The apparatus of claim 21 wherein said switch control means includes means responsive to said control signal for generating a second switch command signal for disconnecting said power source from said torquing means input terminal means a variable time after said first switch command signal, said variable time being related to said amplitude control signal.

23. The apparatus of claim 22 wherein:
said power source means provides a substantially constant magnitude source of power, said power source means including means for selectively providing electrical power of a first and second polarity; and
said switch means including means for alternately selecting one of said power source means first and second polarities for connection to said torquing means input terminal means on command of said first switch command signals so that said spring-mass system oscillates in a rotational mode.

24. The apparatus of claim 21, 22, or 23 wherein said rate detection means includes means for providing said selected signal change at substantially each instant that the rate of change of said phase relationship of said sensor changes polarity.

25. The apparatus of claim 21, 22, or 23 wherein said switch control means includes means for providing said first and second command signals such that each of said torque command pulses is centered substantially about the instant of time between each peak clockwise amplitude of rotation and peak counterclockwise amplitude of rotation so that said sensor oscillates in a rotational mode at its natural resonant frequency.

26. The apparatus of claim 21, 22, or 23 wherein said switch control means includes:
means adapted to receive a first data signal related to the period of the natural resonant frequency of the spring suspended sensor;
means adapted to receive said control signal related to the desired amplitude of rotation of a selected one of a future occurring clockwise and counterclockwise peak amplitude of rotation;
timing means responsive to said first data signal and said control signal for providing said first and second switch command signals, said first switch command signal being generated a first switch time interval after said selected change in signal of said rate detection means output signal, said first switch time interval being directly related to said first data signal, and said second command signal being generated a second switch time interval after said first switch command signal, said second switch time interval being directly related to said control signal thereby synchronizing said torque command pulses to said selected condition of said rate of change of said phase relationship of said sensor.

27. The apparatus of claim 26 wherein said rate detection means includes means for providing said selected signal change at substantially each instant that the rate of change of said phase relationship of said sensor changes polarity.

* * * * *